United States Patent
Kim et al.

(10) Patent No.: US 9,691,267 B2
(45) Date of Patent: Jun. 27, 2017

(54) ENVIRONMENT DETECTION SYSTEM HAVING COMMUNICATION RECOVERY FUNCTION INCLUDING ISOLATOR COUPLED TO TWO-WAY COMMUNICATION LOOP

(71) Applicant: B-I INDUSTRIAL CO., LTD., Busan (KR)

(72) Inventors: Yeong Soo Kim, Seoul (KR); Sang Ryun Kim, Seoul (KR); Je Ryun Kim, Seoul (KR)

(73) Assignee: B-I INDUSTRIAL CO., LTD., Busan (KR)

( * ) Notice: Subject to any disclaimer, the term of this patent is extended or adjusted under 35 U.S.C. 154(b) by 0 days.

(21) Appl. No.: 15/032,828

(22) PCT Filed: Sep. 29, 2014

(86) PCT No.: PCT/KR2014/009104
§ 371 (c)(1),
(2) Date: Apr. 28, 2016

(87) PCT Pub. No.: WO2015/064918
PCT Pub. Date: May 7, 2015

(65) Prior Publication Data
US 2016/0247386 A1  Aug. 25, 2016

(30) Foreign Application Priority Data
Oct. 28, 2013  (KR) ................. 10-2013-0128699

(51) Int. Cl.
*G08B 29/18* (2006.01)
*H04B 3/56* (2006.01)
*H04B 3/54* (2006.01)

(52) U.S. Cl.
CPC ............ *G08B 29/185* (2013.01); *H04B 3/54* (2013.01); *H04B 3/546* (2013.01); *H04B 3/56* (2013.01); *H04B 2203/5458* (2013.01)

(58) Field of Classification Search
CPC combination set(s) only.
See application file for complete search history.

(56) References Cited

U.S. PATENT DOCUMENTS

| | | | |
|---|---|---|---|
| 7,405,652 B2* | 7/2008 | Hair, III ................. | H04B 3/54 340/12.32 |
| 2006/0262881 A1* | 11/2006 | Cern ....................... | H04B 3/56 375/300 |
| 2014/0133186 A1* | 5/2014 | Balakrishnan .... | H02M 3/33523 363/17 |

FOREIGN PATENT DOCUMENTS

| KR | 10-0343045 | 7/2002 |
|---|---|---|
| KR | 10-0816984 | 3/2008 |

(Continued)

OTHER PUBLICATIONS

International Search Report for PCT/KR2014/009104 mailed Jan. 8, 2015, two pages.

(Continued)

*Primary Examiner* — Kabir A Timory
(74) *Attorney, Agent, or Firm* — Nixon & Vanderhye P.C.

(57) ABSTRACT

The present invention provides a communication recovery method using an isolator in a communication system through a power line of land and marine equipment, wherein the method promptly senses situations, such as a disconnection or a short-circuit of a communication line, and restores the communication line for sensing and warning fire or gas in a larger sized space such as an inside/outside of a ship and an inside/outside of a plant or a building.

5 Claims, 12 Drawing Sheets

(56) References Cited

FOREIGN PATENT DOCUMENTS

| KR | 10-2008-0098950 | 11/2008 |
| KR | 10-0998140 | 12/2010 |
| KR | 10-1311950 | 9/2013 |

OTHER PUBLICATIONS

Written Opinion of the ISA for PCT/KR2014/009104 mailed Jan. 8, 2015, three pages.

* cited by examiner (a)

(b)

(a)

(b)

(a)

(b)

(a)

(b)

(a)

(b)

(a)

(b)

(a)

(b)

ENVIRONMENT DETECTION SYSTEM HAVING COMMUNICATION RECOVERY FUNCTION INCLUDING ISOLATOR COUPLED TO TWO-WAY COMMUNICATION LOOP

This application is the U.S. national phase of International Application No. PCT/KR2014/009104 filed 29 Sep. 2014 which designated the U.S. and claims priority to KR Patent Application No. 10-2013-0128699 filed 28 Oct. 2013, the entire contents of each of which are hereby incorporated by reference.

BACKGROUND OF THE INVENTION

Field of the Invention

The present invention relates to a communication recovery method using an isolator in a communication system through a power line, and more particularly, to a communication recovery method which can restore communication lines quickly in case of a disconnection or a short-circuit of the communication lines in the communication system for sensing and warning fire or gas in a large space such as an inside/outside of a ship or an inside/outside of a plant or a building.

Description of the Related Art

In order to sense and warn fire or gas in a large space such as an inside/outside of a ship or an inside/outside of a plant or a building, a smoke sensor for sensing generation of smoke, a temperature sensor for sensing surrounding temperatures, a flame sensor for sensing generation of flame, etc. have been provided, and systems for sensing generation of fire according to operation of the respective sensor have been used.

FIG. 1 schematically illustrates an overall configuration of a conventional fire generation sensing system.

Referring to FIG. 1, a conventional fire sensing and warning system, includes a first power supply A; a second power supply B; a direct current power supply C for emergency; a main control panel 10 for overall control of the system; a sensing device 20 including various sensors such as, a smoke sensor, a heat sensor, a complex sensor, a camera module unit, a VO unit, a conventional sensor, an addressable unit, a manual call point, a flame sensor, and an I.S barrier unit, and an alarm device for warning; a peripheral device 50 including a 8-channel standard relay and 8-channel programmable relay; a repeater panel 60 for the relay of various information to the main control panel 10; a sub-panel 40; and an interface unit 30.

FIG. 2 is a block diagram illustrating in detail a configuration of an interface unit in FIG. 1.

Referring to FIG. 2, various sensing devices 20 are connected to one communication loop 70. Specifically, the communication loop 70 is formed by at least two parallel lines 11 and 12 both ends of which are connected to the interface unit 30, and the lines 11 and 12 are connected to +terminal and terminal of devices including the sensor, respectively. Some examples of the sensing device 20, which may be connected to the communication loop 70, are a smoke sensor for sensing generation of smoke, a temperature sensor for sensing the temperature of a surrounding area, an emergency manual push switch which may be manually operated on emergency, a timer for counting a preset time, an alarm unit, and an I/O unit. When the interface unit 30 includes a plurality of loop cards, the communication loop 70 may be extended to a plurality of units, and a plurality of sensing devices may be connected to the communication loop 70 within an identifiable range. For example, if various devices such as sensors may be identified in the communication loop 70 by 7 bit signal, about 127 devices can be available. The interface unit 30 includes a loop 1-A terminal 31, a loop 1-B terminal 32, a communication interface 35, a power terminal 36, and an MCU 38 and may communicate with the main control panel 10 through the communication interface 35. Further, the interface unit 30 may be connected to the lines 11 and 12 which form the communication loop 70, and may receive a signal for controlling the sensing device 20 from the main control panel 10 and output it to a needed place. Further, the interface unit 30 may receive an electric current from the respective sensing devices 20, and then transmit it to the main control panel 10.

FIGS. 3(a) and 3(b) illustrate a method of using an isolator according to an embodiment of the present invention.

However, when the lines 11 and 12 forming the communication loop 70 are short-circuited or disconnected, sensors within the above range may not be operated.

SUMMARY OF THE INVENTION

To solve the above problems, the object of the invention is to provide a communication recovery method using an isolator in a communication system through a power line of land and marine equipment.

To achieve the above object, according to an embodiment of the invention, an environment sensing system including an isolator coupled to a bi-directional communication loop having a communication recovery function may comprise: a communication loop including a first line and a second line; an interface unit which includes a loop A terminal connected to one end of each of the first line and the second line and a loop B terminal connected to the other end of each of the first line and the second line, outputs a predetermined operating voltage and a digital call signal calling a specific device, through the first line by using at least one of the loop A terminal and the loop B terminal, receives a change in an electric current on the second line by using at least one of the loop A terminal and the loop B terminal, and then converts the change in the electric current into a received signal; a plurality of sensors which are connected to the first line and the second line, are operated by the operating voltage from the first line, and generate a measurement value by sensing an environment state, and transmit an address data of the sensors and the measurement value by changing electric current of the second line in response to the digital call signal; an isolator which is connected to the first line and the second line and maintains the lines in a normal connection state in case of a normal situation and converts a short state into an isolation state by disconnecting at least one of the first and second lines in case of an abnormal situation in which the first line and the second line of the communication loop are shorted; and a main control panel which provides the digital call signal for calling at least one of the plurality of sensors to the interface unit and determines an environment state around the at least one of the plurality of sensors based on the measurement value extracted from the received signal of the interface unit.

According to a further embodiment of the environment sensing system, in the interface unit, the operating voltage and the digital call signal may be outputted to one end of the first line through the loop A terminal, a change in electric current on the second line may be received simultaneously in the loop A terminal and the loop B terminal, and, if the change in the electric current is not received in one of the loop A terminal and the loop B terminal, the operating voltage and the digital call signal may be outputted to the other end of the first line by the loop B terminal.

According to a further embodiment of the environment sensing system, the isolator may transmit the address data thereof and isolation state data indicating whether having been converted into an isolation state by changing an electric current on the second line in response to the digital call signal on the first line which calls the isolator, and if the isolation state data is extracted from the received signal the main control panel may determine generation of an abnormal state in the communication loop in which an isolator corresponding to the isolation state data is arranged.

According to a further embodiment of the environment sensing system, the isolator may include: +VDD terminal which is formed by being branched from the first line; −IN terminal which is coupled with one end which is created by cutting the second line; −OUT terminal which is coupled with the other end which is created by cutting the second line; and an operating circuit unit which connects the −IN terminal with the −OUT terminal if the operating voltage is applied to the +VDD terminal and separates the −OUT terminal from the −IN terminal if the operating voltage is sensed at the −OUT terminal while the operating voltage is also sensed at the +VDD terminal.

According to a further embodiment of the environment sensing system, the operating circuit unit of the isolator may include: a first diode having an anode coupled with the −OUT terminal; a second diode having an anode coupled with the −IN terminal and a cathode coupled with a cathode of the first diode; a first resistor and a third resistor of which one ends are respectively coupled with the cathodes of the first and second diodes; a first PNP transistor having a base coupled with the other end of the first resistor and an emitter coupled with the +VDD terminal; a first N channel FET having a drain coupled with the −IN terminal and a source coupled with the other end of the third resistor; a second N channel FET having a drain coupled with the −OUT terminal and a source coupled with the other end of the third resistor; and a second resistor having one end coupled with a collector of the first PNP transistor and the other end coupled with a gate of the first N channel FET and a gate of the second N channel FET together.

According to the above described present invention, in land and marine equipment, even when there occur abnormal situations on the line such as a short circuit, a current leakage and a disconnection, the isolator allows the lines at the rear stage of the part having an abnormal state to be cut off and allows the lines at the front stage of the part having such an abnormal state to be operated to keep transmission and receipt of signals in a normal state. In addition, the isolator which has detected the abnormal state may transmits address thereof to the loop kept in a communication state, so that the disconnection point may be clearly detected despite the disconnection of the line, thereby quickly responding to the failure.

DETAILED DESCRIPTION OF EMBODIMENTS

Hereinafter, a communication recovery method using an isolator in a communication system of land and marine equipment according to an embodiment of the present invention will be described in detail with reference to the attached drawings.

Figure 1:
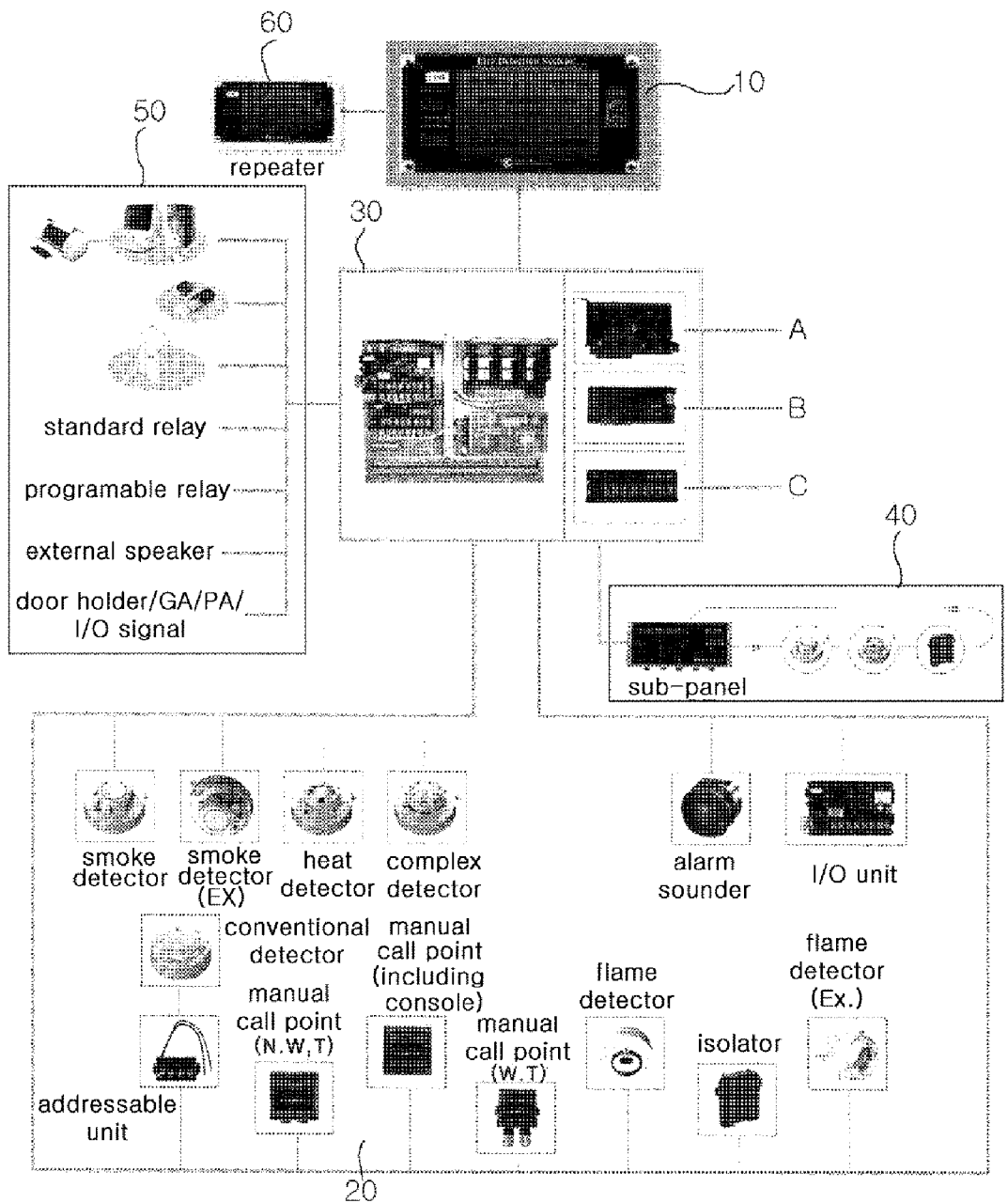
FIG. 1 schematically illustrates an overall configuration of a conventional fire generation sensing system.
Figure 2:
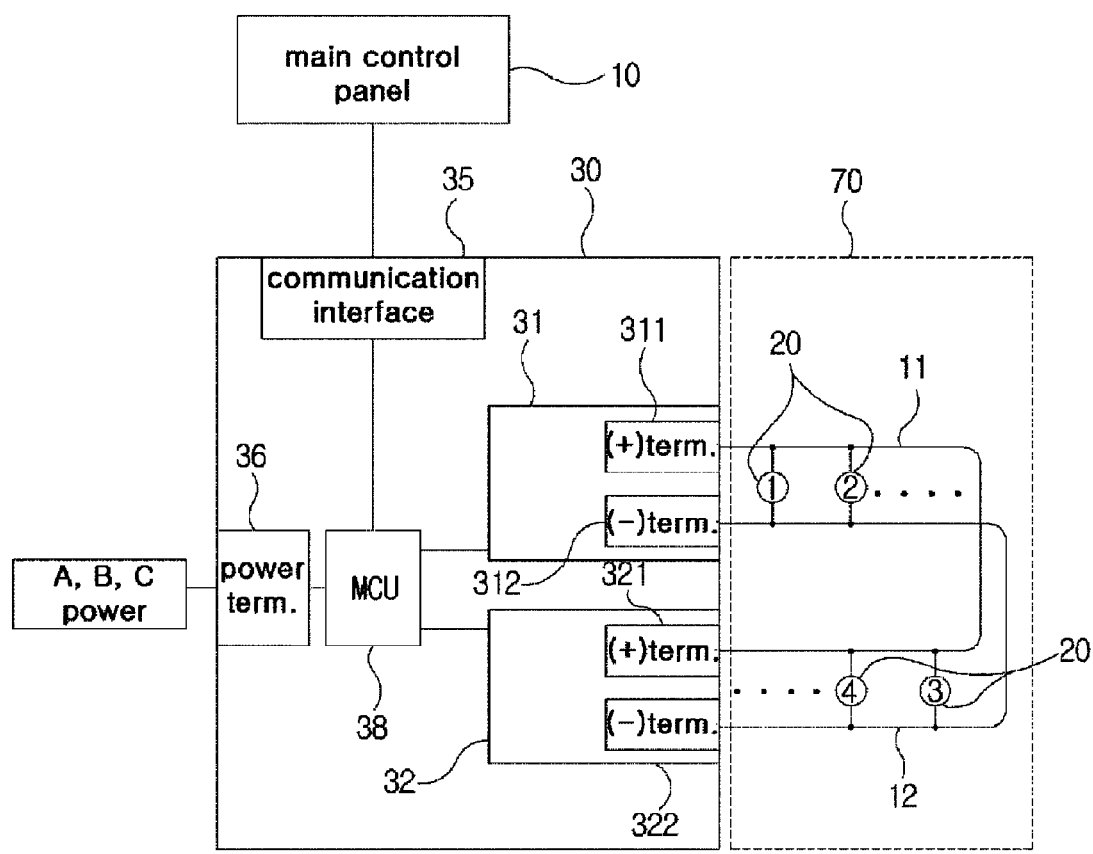
FIG. 2 a block diagram illustrating in detail a configuration of an interface unit in FIG. 1.
Figure 3:
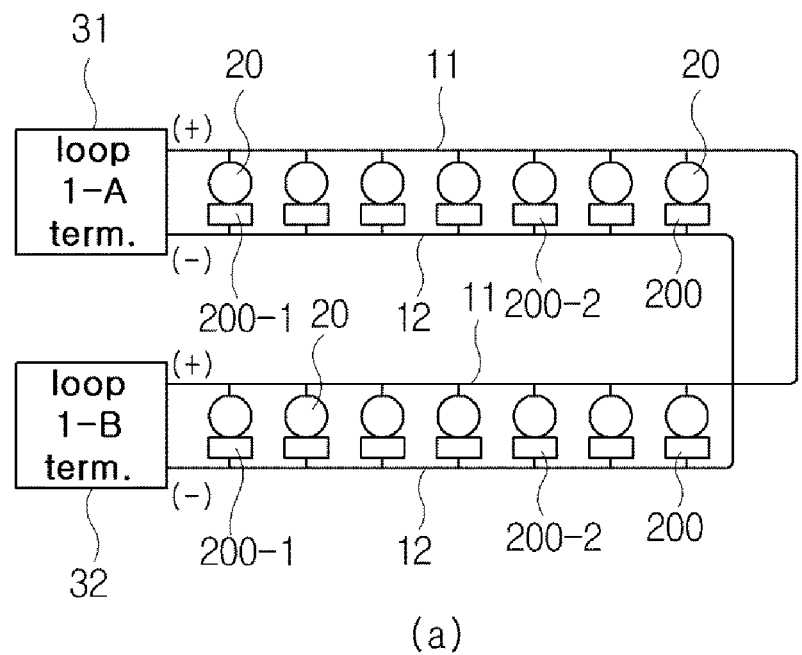
FIGS. 3(a) and 3(b) illustrate a method of using an isolator according to an embodiment of the present invention.
Figure 3:
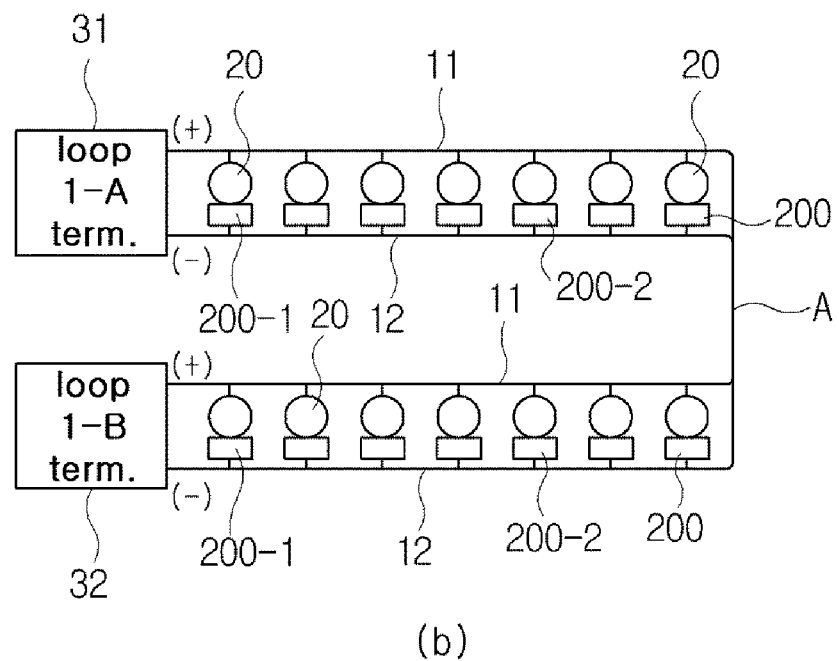

Here, a scheme of transmitting a call signal via a plus (+) line and receiving a signal from a sensor via a minus (−) line by means of power line communication is used. Referring to FIG. 3(a), an isolator 200 is installed in each of sensing devices 20. However, the isolator 200 can be installed only in an isolator 200-1 and an isolator 200-2 illustrated in FIG. 3(a), in other words every 3 or 4 sensors for convenience.

Referring to FIG. 3(b), as shown in zone A, when there is a short-circuit on the lines, both the isolator 200-2 and the isolator 200-2 adjacent to this short-circuit zone can disconnect lines concurrently. Thus every sensor within the above zone may not be operated.

Figure 4:
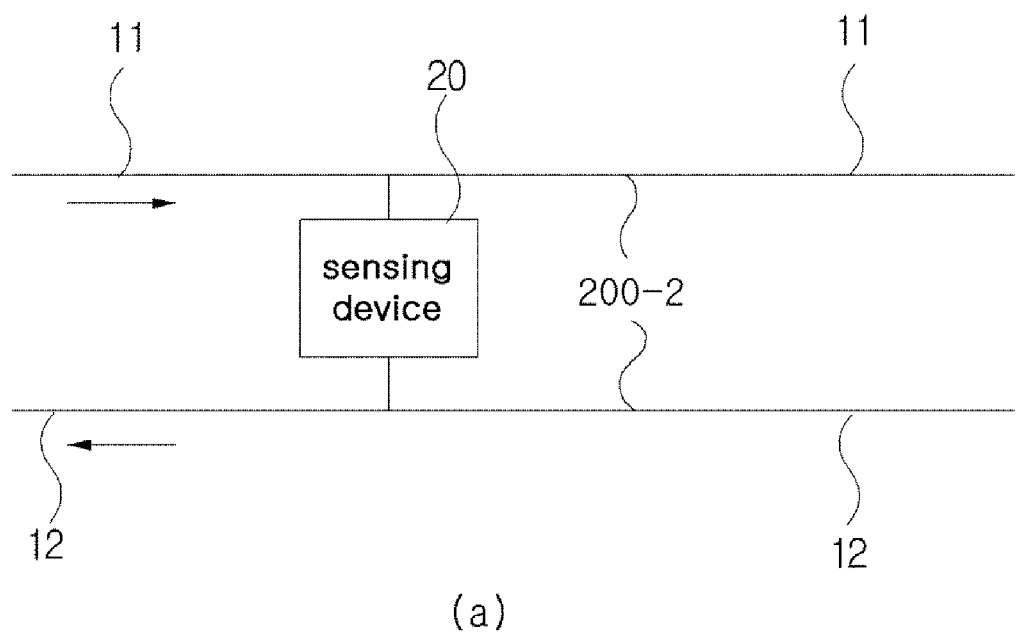
FIGS. 4(a) and 4(b) respectively illustrate a normal state and a short-circuit state or an over-current state in the configuration of lines of a communication loop including an isolator according to an embodiment of the present invention.
Figure 4:
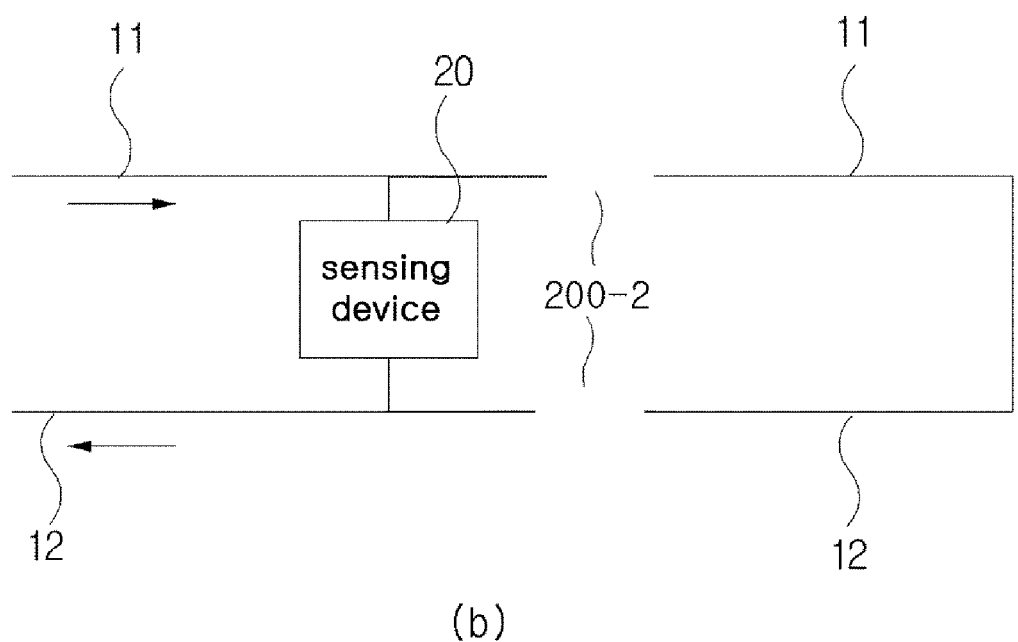

FIGS. 4(a) and 4(b) respectively illustrate a normal state and a short-circuit state or an over-current state in the configuration of lines of a communication loop including an isolator according to an embodiment of the present invention.

Referring to FIGS. 4(a) and 4(b), FIG. 4(a) illustrates a state where lines 11 and 12 are normally connected, and FIG. 4(b) illustrates a state where lines 11 and 12 are short-circuited. In FIG. 4(a), the sensing device 20 is driven by an operating voltage from the line 11, and generates a measurement value by sensing an environment state, and transmits the address data and measurement value thereof by changing an electric current of the line 12 in response to a digital call signal. In addition, the isolator 200-2 can receive an isolation confirmation signal through an interface unit 30 from the main control panel 10 and transmit the address thereof and the state of lines 11' and 12' where the isolator 200-2 is positioned, to the interface unit 30. The isolator 200-2 may be included in the sensing device 20 and may also be arranged in a loop base unit described below. Therefore, a communication circuit for transmission/reception of signals and a CPU for control may be included in the sensing device 20 and the isolator 200-2. The address and the state signal, which are transmitted to the interface unit 30, are transmitted to the main control panel 10. The main control panel 10 may confirm which state any line of a number of lines is now in by confirming the address and the state of the isolator 200-2.

Figure 5:
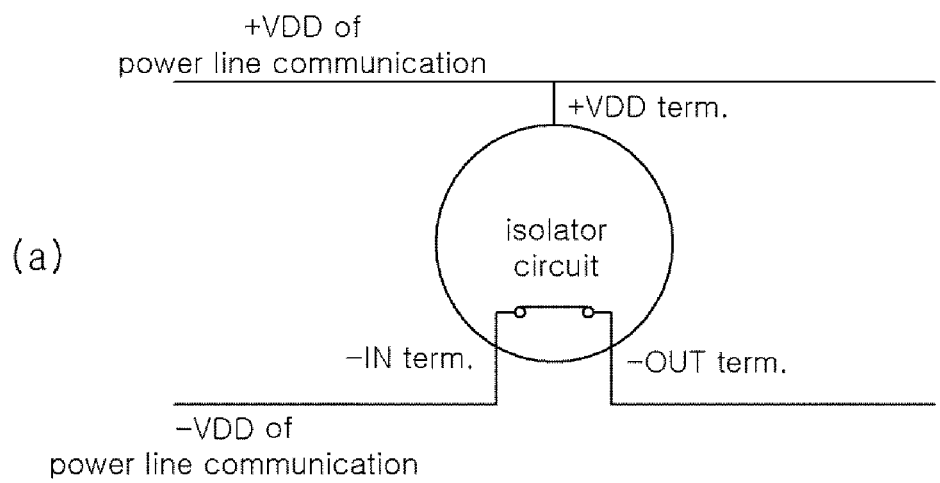
FIGS. 5(a) and 5(b) are diagrams for explaining operation scheme of isolator.
Figure 5:
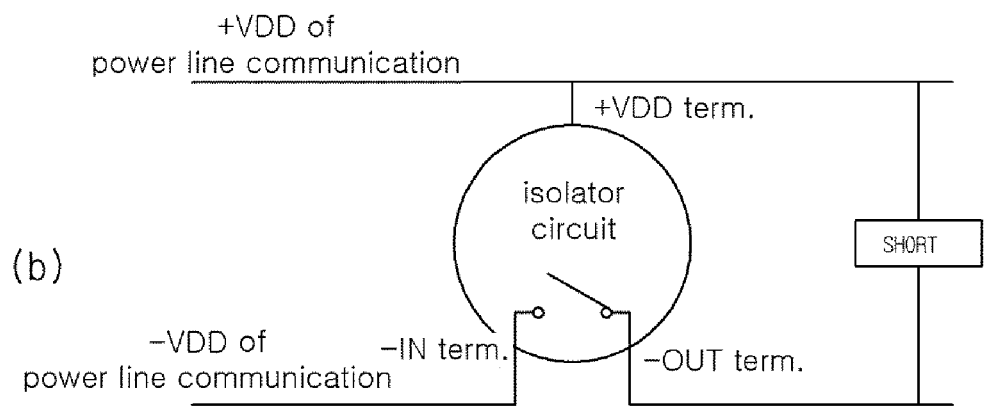

FIGS. 5(a) and 5(b) are drawings which explain an operation concept of an isolator.

The isolator circuit is operated to prevent a short circuit of +VDD voltage of +VDD line and −VDD voltage of −VDD line by opening at least one (in particular, −VDD line) of +VDD line and −VDD line of a power line communication at an abnormal state where +VDD line and −VDD line of a power line communication are short-circuited.

This isolator circuit includes +VDD terminal branched from +VDD line. In addition, the isolator circuit includes a −IN terminal connected to one end of a cut portion of −VDD line and a −OUT terminal connected to the other end of the cut portion thereof.

In this configuration, the isolator circuit may operate by mean of +VDD voltage and may operate to ensure the continuity of −VDD line by electrically connecting −IN terminal and −OUT terminal together at a normal state and to open −VDD line by isolating −OUT terminal from −IN terminal at an abnormal state.

This operation may be understood with reference to an equivalent configuration view of FIGS. 4(a) and 4(b).

In FIG. 4(a) since −IN terminal and −OUT terminal are connected together, +VDD line and −VDD line independently are maintained a continuity. Therefore, any device connected to the rear stage of the isolator circuit may keep an operation and a power line communication by using +VDD voltage and −VDD voltage, Meanwhile, in FIG. 4(b) −IN terminal and −OUT terminal are isolated since a short circuit of the line is generated at the rear stage of the isolator circuit. Thereby, the disconnection effect occurs at the isolator circuit.

Figure 6:
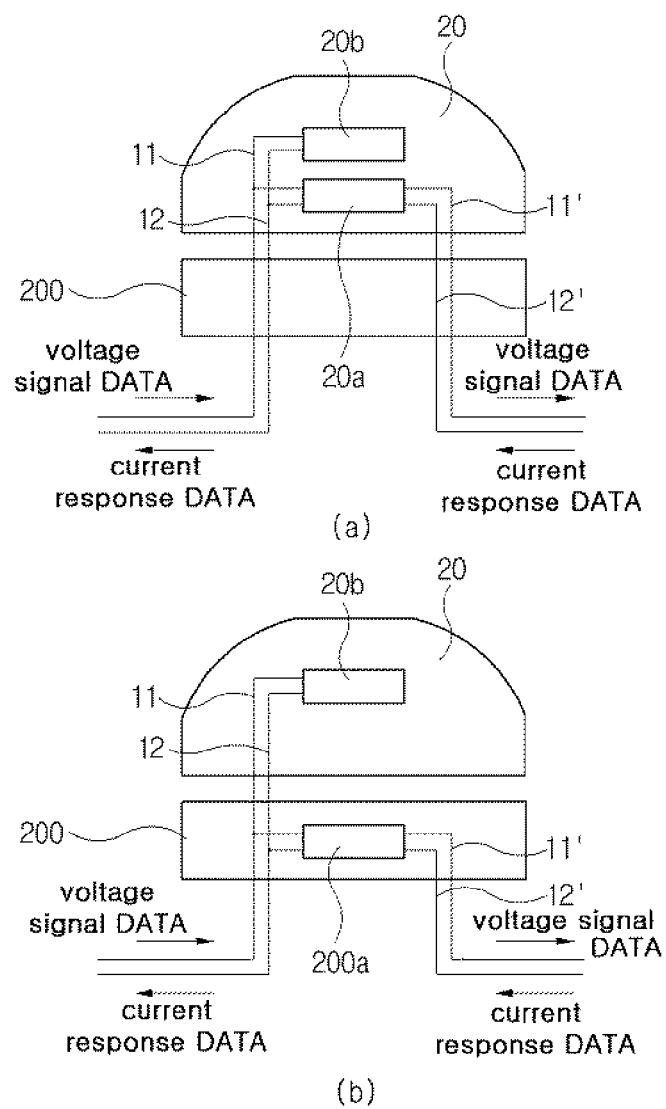
FIGS. 6(a) and 6(b) are diagrams illustrating the detailed configurations of the isolator according to FIGS. 3(a) and 3(b).

FIGS. 6(a) and 6(b) are block diagrams illustrating a detailed configuration of the isolator of FIGS. 5(a) and 5(b) according to an embodiment of the present invention.

Referring to FIG. 6(a), the sensing device 20 includes a detector circuit 20b for sensing smoke, heat, and flame, and the isolator 20a. If a voltage signal for confirming the state of lines 11' and 12' is transmitted from the interface unit 30, the isolator 20a of the sensing device 20 can transmit a signal having information on a sensed state of the smoke, heat, flame, etc. received from the detector circuit 20b and a signal having information on an address of the sensing device 20 where the isolator 20a is positioned, to the interface unit 30 by using the electric current signal. The main control circuit 10 may compare the signal value of the current signal transmitted from the interface unit 30 with the content of the current value stored in the database of the main control circuit 10, to analzye which information the transmitted current signal contains.

Referring to FIG. 6(b), in this case, the loop base unit 200 includes an isolator having an address transmission function. If a voltage signal for confirming the state of lines 11' and 12' is received from the interface unit 30, the isolator 200a of the loop base unit 200 can transmit the signal having information on the sensed state of smoke, heat, flame, etc. received from the detector circuit 20b and the signal having information on the address of the sensing device 20 where the isolator 200a is positioned, to the interface circuit 30 by using the electric current signal. The main control circuit 10 may compare the signal value of the current signal transmitted from the interface unit 30 with the content of the current value stored in the database of the main control circuit 10, to analzye which information the transmitted current signal contains.

Figure 7:
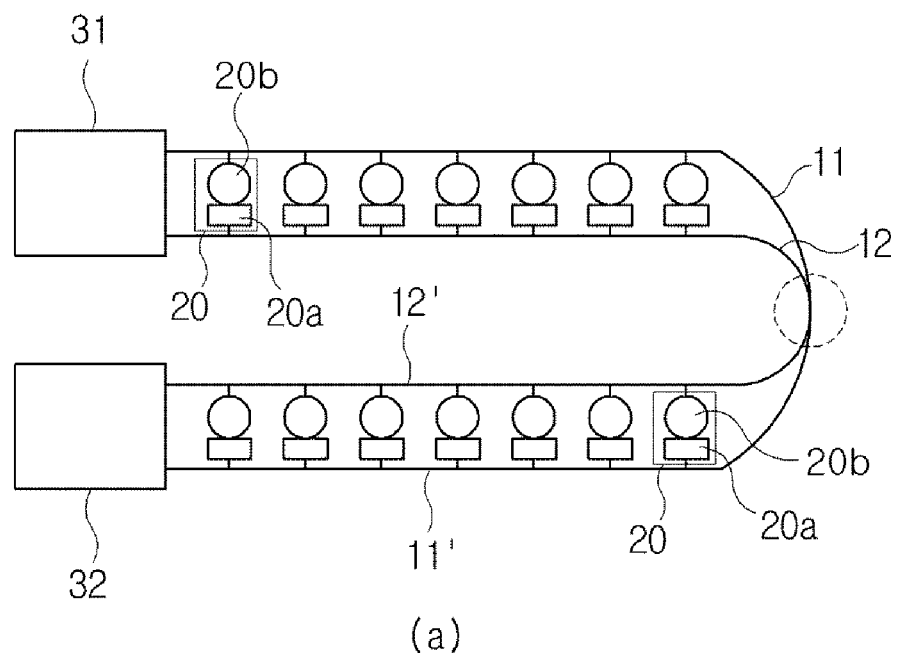
FIG. 7(a) illustrates that a short-circuit state or a current leakage state occurs in the lines with the isolator illustrated in FIG. 6(a).
FIG. 7(b) illustrates FIG. 7(a) more in details.
Figure 7:
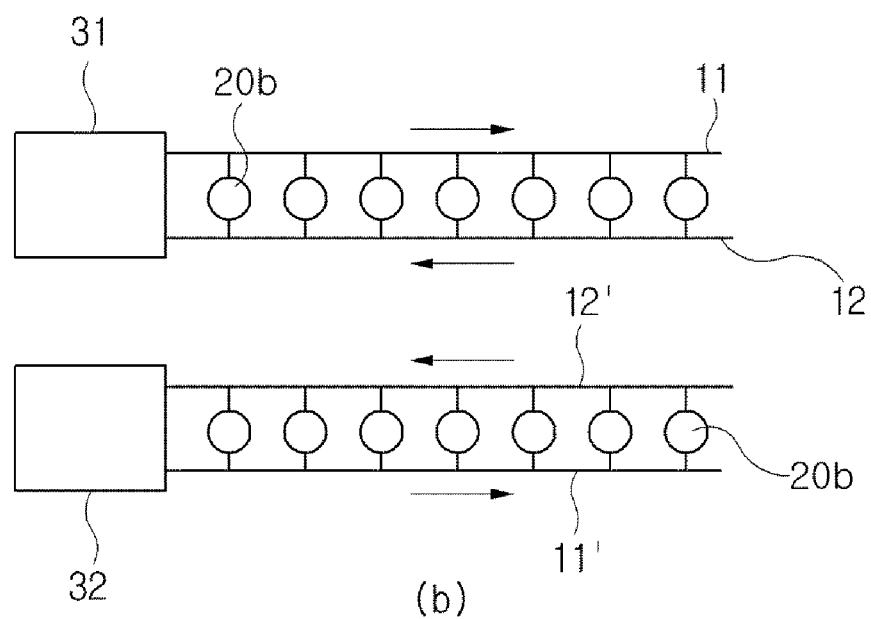

FIG. 7(a) shows generation of line abnormality such as a short-circuit in the lines with the isolator illustrated in FIG. 6(a), and FIG. 7(b) illustrates an equivalent circuit for a circuit in which short-circuited lines of FIG. 7(a) are restored.

Referring to FIG. 7(a), when there is a line abnormality such as a short-circuit in the loop, i.e., the lines 11 and 12, the isolator 20a of the sensing device 20 shortly before the short-circuit part indicated with a circle in the drawings is operated to isolate the lines. With this, the loop at the front stage of this isolator, i.e. only the lines 11' and 12' before the short-circuit, is operable, and the lines 11 and 12 at the rear stage thereof are not operated. The isolating operation of the isolator 20a uses a power blocking scheme, but the operation is not limited thereto and another scheme may also be used.

According to the above scheme, the lines 11 and 12 operate without a problem despite the short-circuit of lines 11 and 12. However, because a bi-direction communication is performed in the present invention, as illustrated in FIG. 7(b), voltage signals are outputted from a plus (+) terminal of the loop 1-B terminal 32 and the loop 1-A terminal 31. the lines 11' and 12' are disconnected by the isolator 20a at the front stage of the short-circuited portion indicated with a circle, so that an electric current is inputted to a minus (−) terminal of the loop 1-B terminal 32. The electric current signal contains isolation state data and address data of the isolator 20a.

Figure 8:
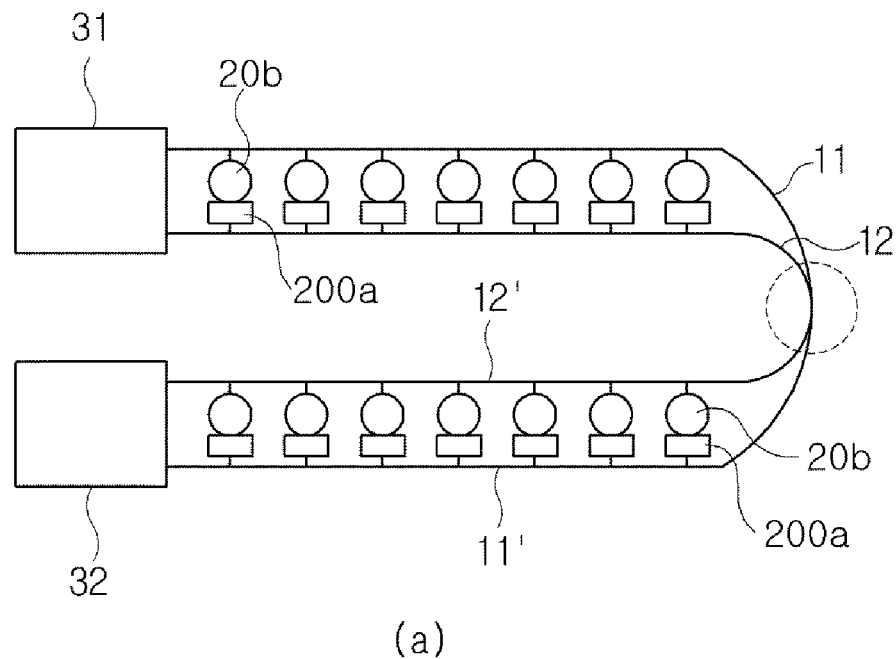
FIG. 8(a) illustrates that a short-circuit state or a current leakage state occurs in the lines with the isolator illustrated in FIG. 6(b).
FIG. 8(b) illustrates FIG. 8(b) more in details.
Figure 8:
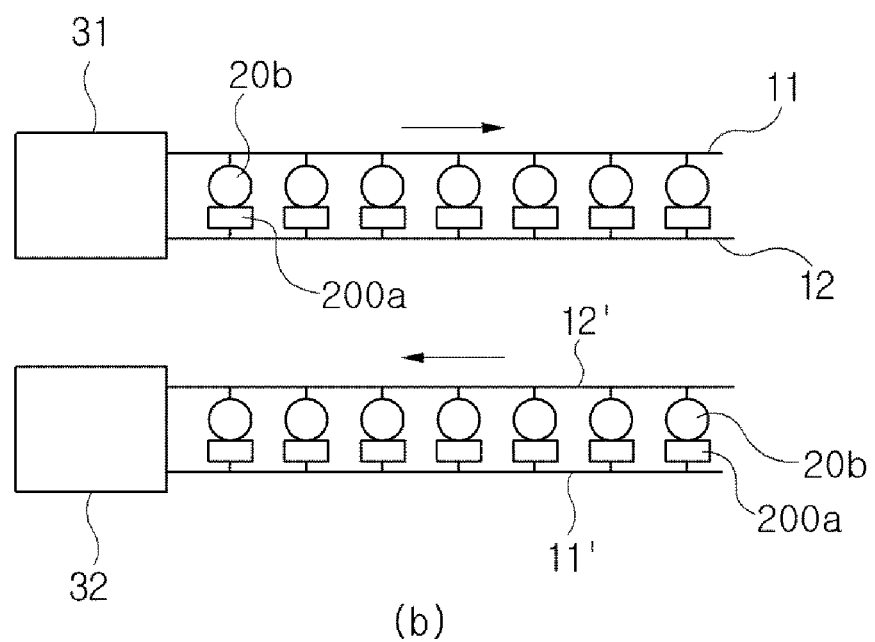

FIG. 8(a) is a drawing for explaining an operation of the isolator when a line abnormality such as a short-circuit occurs in the lines with the isolators illustrated in FIG. 6(b), and FIG. 8(b) illustrates an operation for restoring the short-circuited lines in FIG. 8(a) by the isolator.

Referring to FIG. 8(a), when there is a line abnormality such as a short-circuit in the loop, i.e., lines 11 and 12, the isolator 200a immediately in front of the short-circuit part indicated with the circle is operated to isolate the lines. With this, only the lines 11' and 12' at the front of the short-circuit are operable and the lines 11 and 12 at the rear stage thereof are not operated. Here, FIG. 8(a) is the same as FIG. 7(a) except that the isolator 200a having an isolating function and an address transmission function may be embedded into the loop base unit 200. In addition, the loop base unit 200 may include a communication circuit for transmitting the isolation state to the sensing device 20. According to the above description, the lines 11 and 12 operate without a problem despite the short-circuit of lines 11 and 12. However, because the bi-directional communication is performed in the present invention, as illustrated in FIG. 8(b), voltage signals are also outputted from a plus (+) terminal of the loop 1-B terminal 32. The lines 11' and 12' are disconnected by the isolator 200a at the front stage of the short-circuited portion indicated with the circle, so that an electric signal is inputted to a minus (−) terminal of the loop 1-B terminal 32. The electric current signal contains the isolation state data and address data of the isolator 200a.

Figure 9:
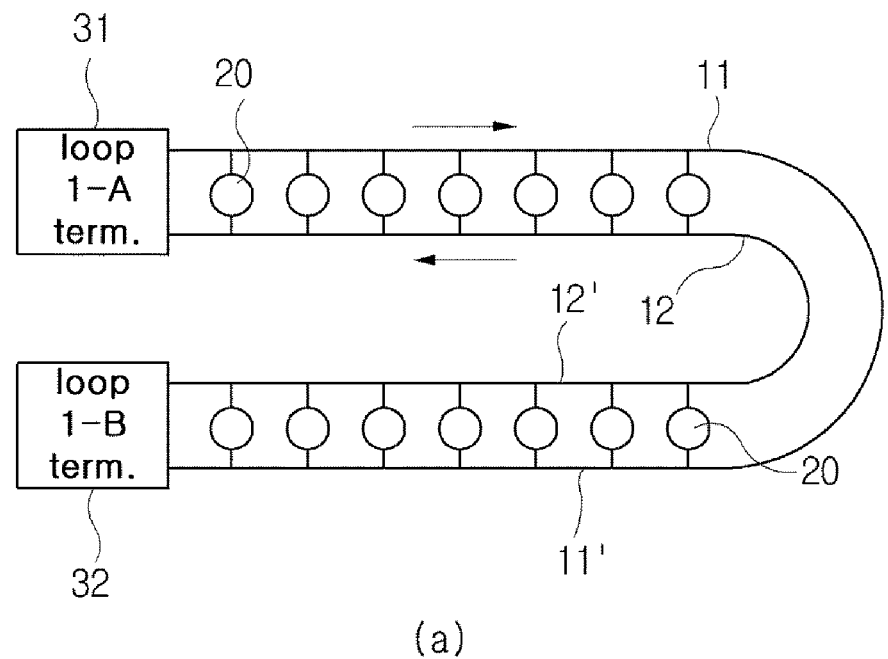
FIGS. 9(a), 9(b), and 10 illustrate operations of an interface unit according to another embodiment of the present invention.
Figure 9:
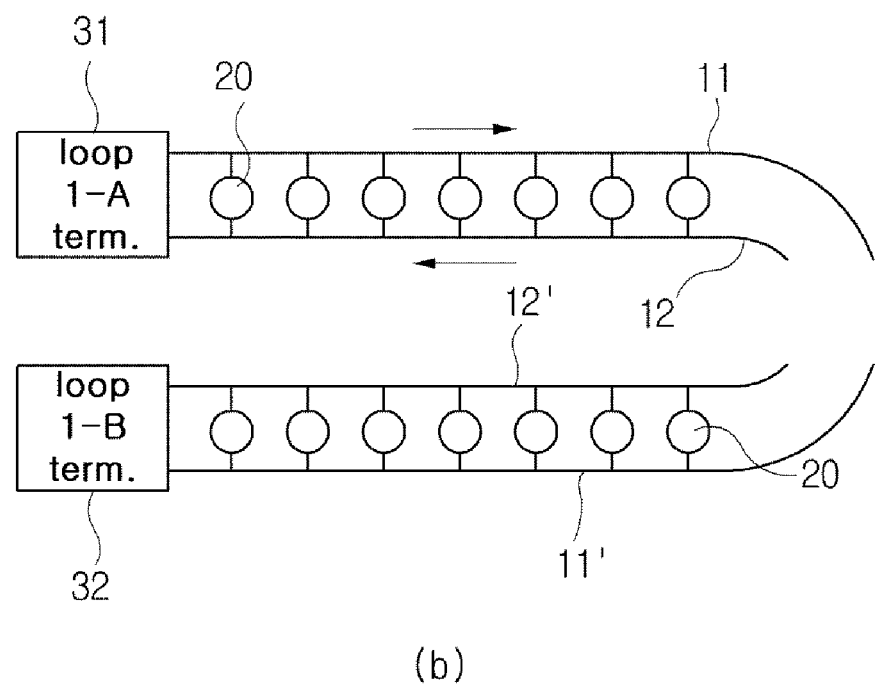
Figure 10:
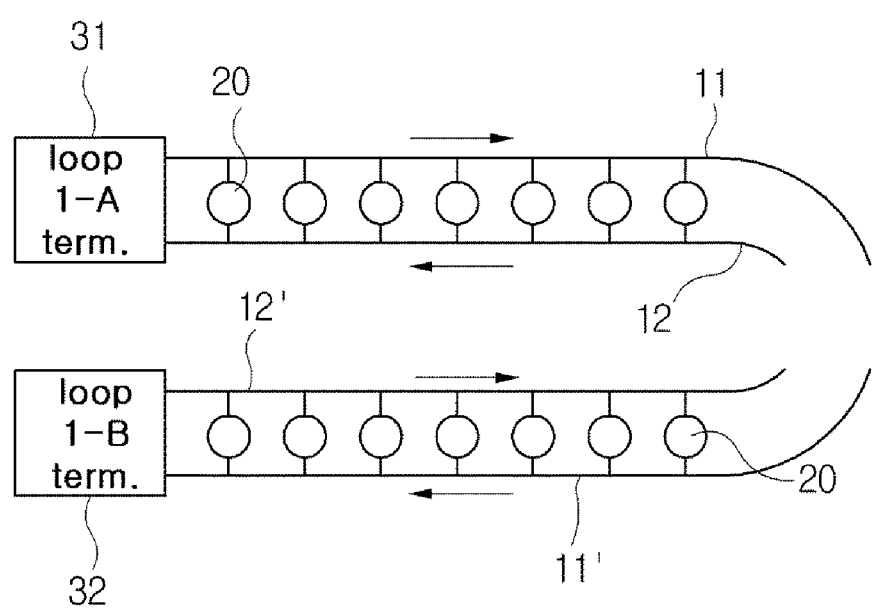

FIGS. 9(a), 9(b), and 10 illustrate an operation of the interface unit according to another embodiment of the present invention.

As illustrated in FIG. 9(a), in case of a normal operation, if voltage signals are transmitted from a plus (+) terminal of loop 1-A terminal 31 to every sensing devices 20, the electric current response signals are inputted from the respective sensing devices 20 to a minus (−) terminal of loop 1-B terminal 32.

However, as illustrated in FIG. 9(b), when the lines are disconnected, a call signal is not transmitted from the loop 1-A terminal 31 to the sensing device 20 in lower part. In this case, as illustrated in FIG. 10, voltage signals are outputted from a plus (+) terminal of loop 1-B terminal 32. In this way, even if the line is disconnected, both the loop 1-A terminal 31 and the loop 1-B terminal 32 may transmit the voltage signals and receive the current signals, and thus a communication is available despite a disconnection.

Figure 11:
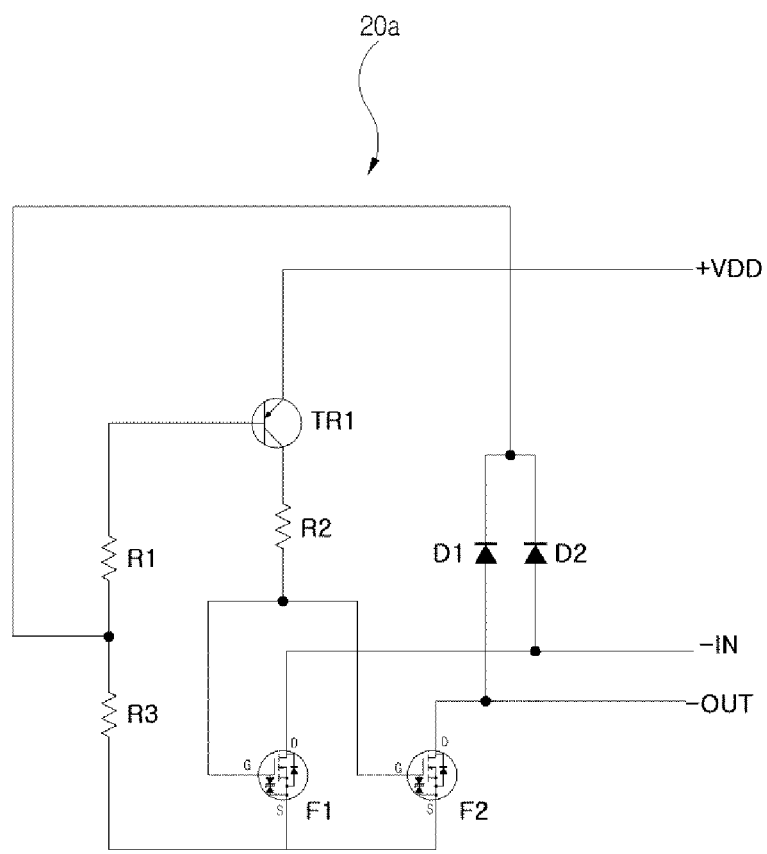
FIG. 11 is a circuit diagram of an isolator according to an embodiment of the present invention.

FIG. 11 is a circuit diagram of an isolator according to an embodiment of the present invention.

Referring to FIG. 11, the isolator includes a first transistor (TR1) for receiving VDD power, a second resistor R2 connected to TR1 in series, a first resistor R1 connected to R2 in parallel, another resistor R3 connected to R1 in series, a first field effect transistor F1 connected to a −power terminal, i.e., −VDD (−IN) in series, a second field effect transistor F2 connected to the output terminal (−OUT) in series, a first diode D1 connected to −OUT in series in a forward direction, and a second diode D2 connected to −VDD in series in a forward direction.

Figure 12:
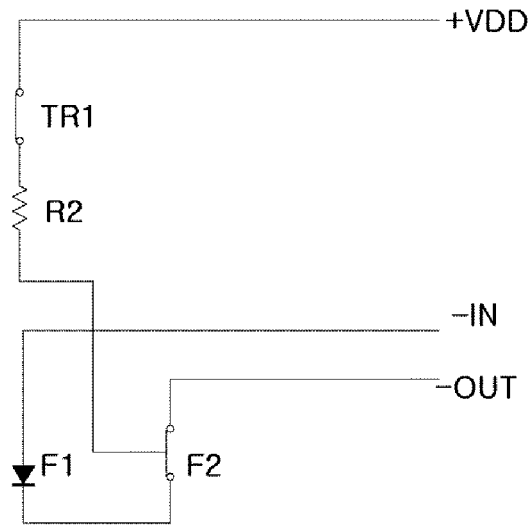
FIGS. 12(a) and 12(b) illustrate an operation of the isolator circuit illustrated in FIG. 10 in a case where power is normally applied to +VDD and −VDD of the isolator circuit and a case where +VDD and an output terminal (−OUT) are short-circuited.
Figure 12:
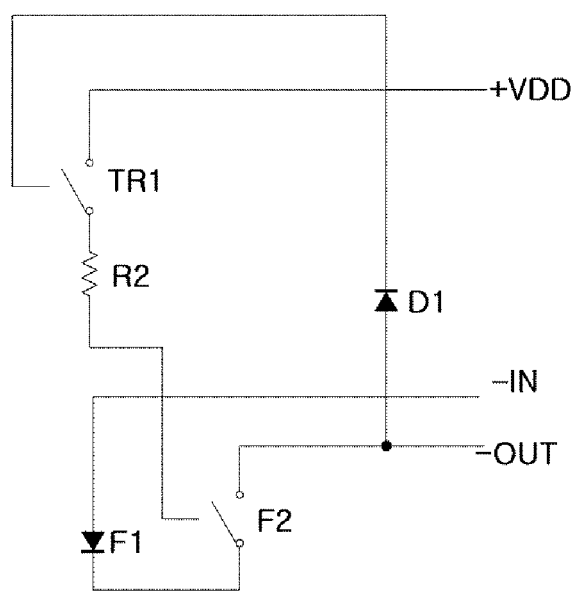

FIGS. 12(a) and 12(b) illustrate an operation of the isolator circuit illustrated in FIG. 11 in case where a plus (+) voltage and a minus (−) voltage of power are normally applied to +VDD and −VDD of the isolator circuit, respectively, and in case where +VDD and an output terminal (−OUT) are short-circuited.

First, referring to FIG. 12(a), a normal state where power is normally applied to +VDD and −IN terminal is illustrated. First, for example, if +VDD voltage is applied to +VDD terminal and −VDD voltage is applied to −IN terminal, (1) −VDD voltage is applied through a switching device F1 (e.g., N channel FET) so that a source of the switching device F1 becomes −VDD voltage; (2) +VDD voltage applied to the emitter of the switching device TR1 (e.g., PNP transistor), generates a weak current via the resistor R1 and resistor R2; (3) if the weak current flows through the switching device TR1, a certain voltage is generated to the resistor R3; (4) the certain voltage is applied to the gate of both the switching device F1 and the switching device F2 (e.g., N channel FET), and thus the switching devices F1 and F2 are turned on; and (5) −VDD voltage applied to a drain of the switching device F1 is applied to −OUT terminal through the switching device F2 which is at an on state.

Further, referring to FIG. 12(b), the operation of an isolator is described when +VDD voltage is simultaneously sensed even at −OUT terminal due to a short-circuit of +VDD line and −OUT line, i.e., in an abnormal state where the first line and the second line are short-circuited in an arbitrary zone, (1) as the first line to which +VDD voltage is applied and the second line connected to −OUT terminal are short-circuited, a short-circuit voltage, i.e., +VDD voltage, is applied to the diode D2; (2) as +VDD voltage is applied to the switching device TR1 through the resistor R1, a current does not flow from the emitter of the switching device TR1 to the resistor R2; (3) hence, as the current does not flow through the resistor R2 and a voltage is not applied to the gate of the switching device F2, and thus the switching device F2 is at an off state; and (4)−VDD voltage does not applied from −IN terminal to −OUT terminal, and thus −OUT terminal is isolated from −IN terminal. Further, −IN terminal is not directly connected to +VDD terminal, and thus both terminals are isolated from each other.

According to the above described present invention, in land and marine equipment, even when there occur abnormal situations on the line such as a short circuit, a current leakage and a disconnection, the isolator allows the lines at the rear stage of the part having an abnormal state to be cut off and allows the lines at the front stage of the part having such an abnormal state to be operated to keep transmission and receipt of signals in a normal state. In addition, the isolator which has detected the abnormal state may transmits address thereof to the loop through which communication is now available, so that the disconnection point may be clearly detected despite the disconnection of the line, thereby quickly responding to the failure.

In the above description, only the communication from one terminal to another terminal in one communication loop is described, but the present invention is not limited thereto, and the present invention may also be applied to the communication between one communication loop and another communication loop.

The above description is simply illustrative of the technical concept of the invention and a person skilled in the art can make considerable modifications, alterations and equivalents in form and functions without departing beyond the scope of the invention. Therefore, since the embodiments disclosed in the invention is not intended to limit the scope of the invention but to describe the invention, the scope of the invention should not be limited by these embodiments. The scope of the invention should be interpreted on the basis of the following claims and all technical concepts within the equivalent range thereof should be interpreted as being included in the scope of the invention.

What is claimed is:

1. An environment sensing system including an isolator coupled to a bi-directional communication loop having a communication recovery function, the environment sensing system comprising:

a communication loop including a first line and a second line;

an interface unit which includes a loop A terminal connected to one end of each of the first line and the second line and a loop B terminal connected to another end of each of the first line and the second line, outputs a predetermined operating voltage and a digital call signal calling a specific device, through the first line by using at least one of the loop A terminal and the loop B terminal, receives a change in an electric current on the second line by using at least one of the loop A terminal and the loop B terminal, and then converts the change in the electric current into a received signal;

a plurality of sensors which are connected to the first line and the second line, are operated by the operating voltage from the first line, and generate a measurement value by sensing an environment state, and transmit an address data and the measurement value of the sensors by changing electric current of the second line in response to the digital call signal;

an isolator configured to be connected to at least one of the first line and the second line, to maintain the lines in a normal connection state in case of a normal situation and to convert a short state into an isolation state by disconnecting at least one of the first and the second lines in case of an abnormal state in which part of the first line and the second line of the communication loop are shorted; and a main control panel configured to provide the digital call signal for calling at least one of the plurality of sensors to the interface unit and to determine an environment state around the at least one of the plurality of sensors based on the measurement value extracted from the received signal of the interface unit.

2. The environment sensing system according to claim 1, wherein, in the interface unit, the operating voltage and the digital call signal are outputted to one end of the first line through the loop A terminal, a change in an electric current on the second line is received simultaneously in the loop A terminal and the loop B terminal, and, if the change in the electric current is not received in the one of the loop A terminal and the loop B terminal, the operating voltage and the digital call signal are outputted to the other end of the first line by the loop B terminal.

3. The environment sensing system according to claim 1, wherein the isolator transmits address data thereof and isolation state data indicating whether having been converted into an isolation state by changing an electric current on the second line in response to the digital call signal on the first line which calls the isolator, and if the isolation state data is extracted from the received signal the main control panel determines generation of an abnormal state in the communication loop in which the isolator corresponding to the isolation state data is arranged.

4. The environment sensing system according to claim 1, wherein the isolator includes
+VDD terminal which is formed by being branched from the first line;
−IN terminal which is coupled with one end which is created by cutting the second line;
−OUT terminal which is coupled with the other end which is created by cutting the second line; and
an operating circuit unit which connects the −IN terminal with the −OUT terminal if the operating voltage is applied to the +VDD terminal and separates the −OUT terminal from the −IN terminal if the operating voltage is sensed at the −OUT terminal while the operating voltage is also sensed at the +VDD terminal.

5. The environment sensing system according to claim 4, wherein the operating circuit unit of the isolator comprises:
a first diode having an anode coupled with the −OUT terminal;
a second diode having an anode coupled with the −IN terminal and a cathode coupled with a cathode of the first diode;
a first resistor and a third resistor of which one ends are respectively coupled with the cathodes of the first and second diodes;
a first PNP (Positive-Negative-Positive) bipolar transistor having a base coupled with the other end of the first resistor and an emitter coupled with the +VDD terminal;
a first N (Negative) channel FET (Field Effect Transistor) having a drain coupled with the −IN terminal and a source coupled with the other end of the third resistor;
a second N channel FET having a drain coupled with the −OUT terminal and a source coupled with the other end of the third resistor; and
a second resistor having one end coupled with a collector of the first PNP transistor and the other end coupled with a gate of the first N channel FET and a gate of the second N channel FET together.

\* \* \* \* \*